United States Patent

Hollingsworth et al.

Patent Number: 6,035,742
Date of Patent: Mar. 14, 2000

[54] HANDLEBAR GRIP ASSEMBLY

[75] Inventors: Joseph E. Hollingsworth, Redondo Beach; E. David Grimes, Norco, both of Calif.

[73] Assignee: Valcor Concept Marketing, Inc., Riverside, Calif.

[21] Appl. No.: 08/876,361

[22] Filed: Jun. 16, 1997

[51] Int. Cl.[7] .......................... B62K 21/12; B62K 21/26
[52] U.S. Cl. .................... 74/551.9; 74/551.8; D8/303
[58] Field of Search ................. 74/551.9, 551.8, 74/489; D8/303

[56] References Cited

U.S. PATENT DOCUMENTS

| | | | |
|---|---|---|---|
| D. 274,122 | 6/1984 | Stahel et al. | D8/303 |
| D. 299,333 | 1/1989 | Coue | D8/303 X |
| D. 411,432 | 6/1999 | Stahel | D8/303 |
| 450,906 | 4/1891 | Blakely | 74/551.9 |
| 570,186 | 10/1896 | Rockwell | 74/551.9 |
| 578,959 | 3/1897 | Wiens et al. | 74/551.9 |
| 605,626 | 6/1898 | Blanchard | 74/551.9 |
| 612,057 | 10/1898 | Richter | 74/551.9 |
| 3,205,729 | 9/1965 | Golden | 74/551.8 |
| 3,405,749 | 10/1968 | Butler | 74/551.9 X |
| 3,982,446 | 9/1976 | Van Dyken | 74/488 |
| 4,158,407 | 6/1979 | Rest | 206/318 |
| 4,535,649 | 8/1985 | Stahel | 74/551.9 |
| 4,716,502 | 12/1987 | Schott et al. | 362/72 |
| 4,893,519 | 1/1990 | Corso et al. | 74/551.9 |
| 5,247,431 | 9/1993 | Liu | 362/72 |
| 5,263,275 | 11/1993 | Rumbaugh | 74/551.9 X |
| 5,507,202 | 4/1996 | Phillips | 74/489 |
| 5,584,213 | 12/1996 | Larson et al. | 74/551.9 |

FOREIGN PATENT DOCUMENTS

| | | | |
|---|---|---|---|
| 873369 | 7/1942 | France | 74/551.9 |
| 5-32191 | 2/1993 | Japan | 74/551.9 |

*Primary Examiner*—Vinh T. Luong
*Attorney, Agent, or Firm*—Edgar W. Averill, Jr.

[57] ABSTRACT

A multi-part handlebar grip which has an inner piece which is secured in a non-turning manner to the handlebars. An outer hand contacting portion interlocks with the inner portion of the grip. The outer portion slides over the inner portion and then is locked in place over the inner portion. The assembly results in a grip which will not turn on the handlebar and which requires no adhesive.

8 Claims, 3 Drawing Sheets

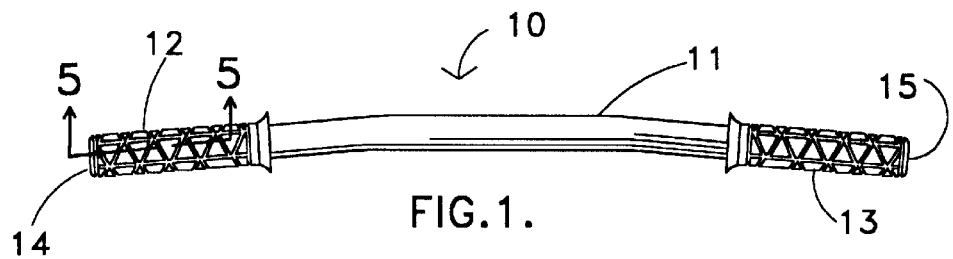
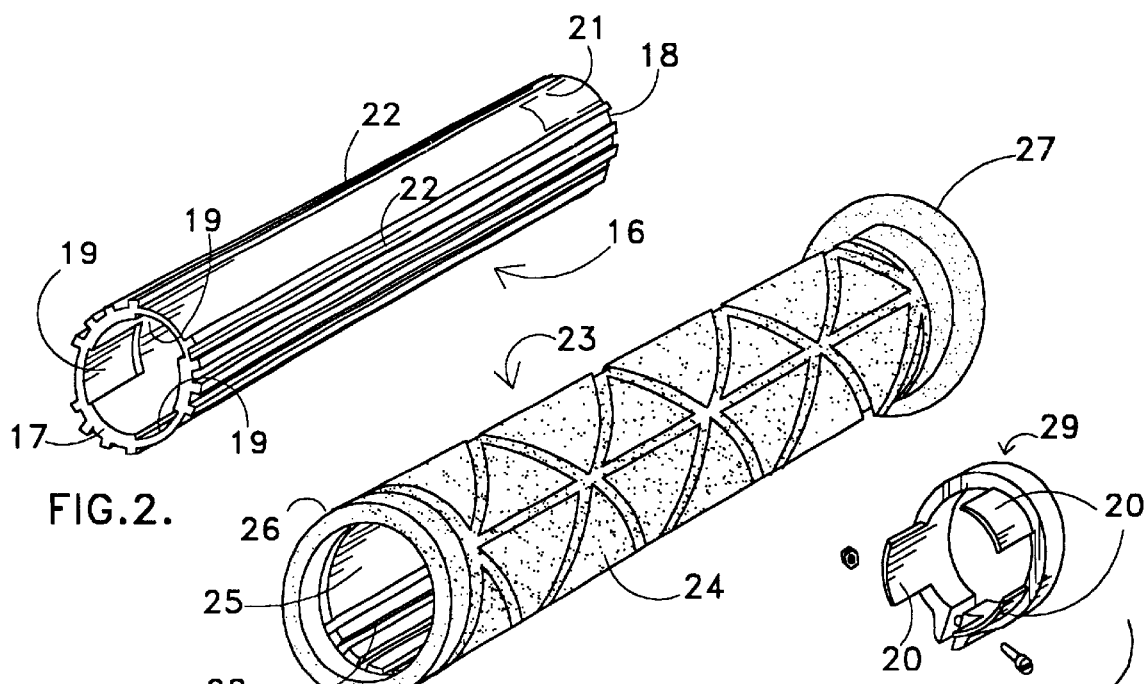

HANDLEBAR GRIP ASSEMBLY

BACKGROUND OF THE INVENTION

The field of the invention is handlebar grips and the invention relates more particularly to handlebar grips which have a relatively soft hand contacting portion. There has been a trend in handlebar grips to provide a softer grip material for increased shock absorption and traction. These softer materials are more difficult to secure to the handlebars and various approaches have been taken to provide a combination of soft hand feel with satisfactory adhesion to the handlebar. A common approach is to place an adhesive between the handlebar and the inner surface of the grip. This, of course, makes it very difficult to remove the grip when a new grip is desired. Furthermore, the adhesive often requires an overnight cure time and, thus, cannot be immediately used.

Various designs have been patented in an attempt to provide a securely held soft grip. One such design is shown in the Kuipers, et al. U.S. Pat. No. 5,280,735. This patent shows a two-piece slip-resistant grip which has an outer nylon lattice housing member with two end clamps. This lattice and end clamp assembly is placed over a softer inner sleeve which extends through the openings in the lattice and is clamped in place by the end cap and flanged end. This assembly is limited to a design where the hand contacting portion is in the shape of diamonds which pass through the lattice. Also, this grip results in the soft inner portion contacting the handlebar and with extended time the soft portion tends to form a bond with the handlebar and is very difficult to remove.

U.S. Pat. No. 3,344,684 to Steere, Jr., et al., shows a handlebar grip which has an inner portion with a transparent or translucent outer portion adhered thereto. The inner portion is slipped on the handlebar without any tightening means. Another two-part grip is shown in U.S. Pat. No. 4,416,166 to Jannard, et al. which has a two-part grip having an outer sleeve fitted over an inner sleeve. These two parts are interlocked by their matching designs.

U.S. Pat. No. 4,535,649 shows a foam surfaced handlebar grip which has a foam sleeve which is held over a hard polymer tube by an end cap and a coupling member. A cork handlebar grip is shown in U.S. Pat. No. 605,626 to Blanchard, Jr. This patent utilizes a slotted tapered pipe which has a nut at each end which captures the cork grip portion.

None of these patents has a combination of quick assembly and removal, a soft pliable outer surface and a harder inner member clamped to the handlebar to provide a slip-free yet removable handlebar grip.

BRIEF SUMMARY OF THE INVENTION

It is an object of the present invention to provide an easily installed and easily removed handlebar grip having a soft outer hand contacting surface with a secure attachment to the handlebar.

The present invention is for a grip assembly for attachment over the end of a hollow tubular handlebar. The grip has an inner clamp member which is tightened directly against the outer surface of the handlebar inwardly from one of the ends thereof. The clamp member has tube engaging means thereon. A handlebar engaging tube is made from a rigid material and is clamped to the handlebar. This is accomplished by forming an interlocking handlebar engaging tube and interlocking end clamp. The handlebar engaging tube also has clamp engaging means and it is interlocked with the end clamps so that it will not turn with respect to the clamps. A generally cylindrical hand engaging grip has an inner surface affixed to the handlebar engaging tube so that it will not turn with respect to the tube. The hand engaging grip is formed of a material and a design to provide the desired tactile feel. The hand engaging grip may have outer rings which surround the inner and outer clamp members. A preferred construction of the clamps has three tabs extending toward the handlebar engaging tube. These tabs may be either fitted in slots on the inner surface of the tube or on the outer surface of the tube. The hand engaging grip may be either slid over the handlebar engaging tube or molded over the handlebar engaging tube. The handlebar engaging tube may have ribs on its outer surface to prevent the hand engaging portion from turning thereon. The end clamps may be integral with a brake handle assembly or hand guard.

BRIEF DESCRIPTION OF THE DRAWINGS

FIG. 1 is a perspective view of a handlebar having a pair of grips of the present invention held thereon.

FIG. 2 is a perspective view of the handlebar engaging tube of one of the grips of FIG. 1.

FIG. 3 is a perspective view of the hand engaging grip member of the grip assembly of FIG. 1.

FIG. 4 is a perspective view of an inner and outer clamp member of the grip assembly of FIG. 1.

DESCRIPTION OF THE PREFERRED EMBODIMENTS

Figure 5:
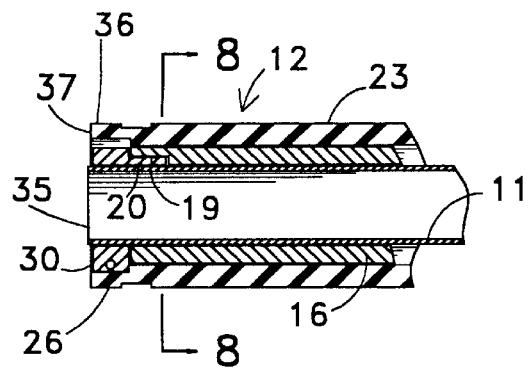
FIG. 5 is an enlarged cross-sectional view of one of the grips of FIG. 1 taken along line 5—5 of FIG. 1.

A set of handlebars is shown in FIG. 1 and indicated generally by reference character 10. Handlebars 10 have a hollow tubular handlebar 11 and a pair of grips 12 and 13 held thereto. Grip 12 is shown over first end 14 of handlebars 10 and grip 13 is shown over the second end 15.

In a first embodiment, the grip assembly 12 has basically four parts. One of these parts is a handlebar engaging tube 16 shown in perspective view in FIG. 2. Handlebar engaging tube 16 has an outer end 17 and an inner end 18. Tube 16 has three molded recesses 19 at each end which comprise clamp engaging means. Three curved tabs 20 which are part of the clamp members described below fit in these recesses 19 and prevent the handlebar engaging tube 16 from turning with respect to the clamps. These recesses are formed both at outer end 17 and at inner end 18 where the recesses are shown in phantom view and indicated by reference character 21. Handlebar engaging tube 16 may be fabricated from a metal or a durable plastic and are preferably injection molded from a polycarbonate polymer. Ribs 22 are formed on the outer surface of handlebar engaging tube 16 and provide the means for preventing the grip from turning with respect to tube 16.

A soft generally cylindrical hand engaging grip 23 is shown in perspective view in FIG. 3. Grip 23 has an outer hand engaging surface 24 and an inner surface 25 which abuts the outer surface of handlebar engaging tube 16. Grip 23 also may have enlarged ends 26 and 27 which cover the inner and outer clamp members. Grip 23 is preferably molded from a soft material such as plastisized rubber such as that sold under the trademarks KRATON, J-VON, and STARFLEX. Alternatively grip 23 can be molded from a soft rubber such as Neoprene. This grip 23 can be molded with internal grooves 28 or directly molded over the outer surface of handlebar engaging tube 16.

Figure 7:
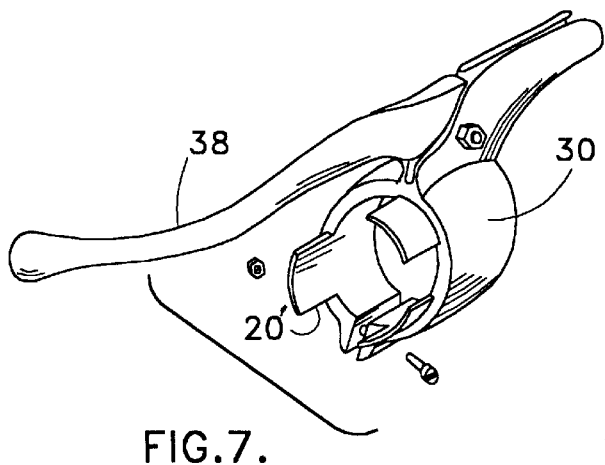
FIG. 7 is a perspective view of an alternate embodiment of the clamp member of FIG. 4.
Figure 8:
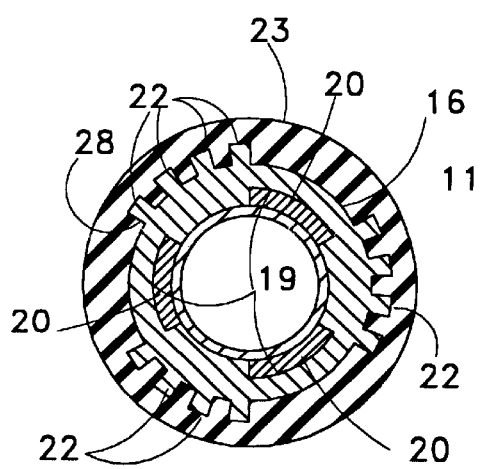
FIG. 8 is a cross-sectional view of an alternate embodiment of the clamp member and handlebar engaging tube of the grip of FIG. 1.

Lastly, the inner and outer clamp members identified by reference characters 29 and 30 are shown in perspective view in FIG. 4. These are preferably made from a lightweight material such as aluminum or from a strong polymer such as a polycarbonate or glass filled nylon. Outer clamp member 30 has three curved tabs 20 which fit within the recesses 19 of handlebar engaging tube 16. While tabs and recesses are shown in FIGS. 2 and 4, other interconnecting means may be utilized such as pins extending from the clamp members into holes formed in the handlebar engaging tube. Alternatively, as shown in FIGS. 7 and 8, the tabs may be placed over the outer surface of handlebar engaging tube 16. The important point is that the clamp clamps directly onto the handlebar so that it is very securely held in place and yet easily removed when loosened and also interconnects with the tube 16 to prevent tube 16 from turning with respect to the clamps and thus, with respect to the handlebar. A nut 31 and screw 32 are held in an opening 33 which surrounds the tightening slot 34 of clamp member 30. The inner clamp member shown in FIG. 4 is identical to the outer clamp member, although the designs may be such that even though these two clamp members have different shapes they can be identical as shown in FIG. 4.

The assembled grip 12 of FIGS. 2 through 4 is shown in cross-sectional view in FIG. 5. There it can be seen that the opening 35 of handlebar 11 is surrounded by outer clamp member 30 which has been tightened by screw 32 threaded into nut 31. The tabs 20 fit in the recesses 19 at both ends of the handlebar engaging tube 16, thus, preventing the tube 16 from turning with respect to handlebar 11 or from moving longitudinally. The outer enlarged end 26 of the hand engaging grip 23 surrounds the clamp 30 and the clamp 29 at the other end. One of the advantages of the design of the present invention is that the handlebar can be shortened by cutting the same at arrow 36 or at any point between arrow 36 and the outer end 37. The same amount of material is also removed from the end of the handlebar engaging tube 16 to provide room for clamp 30 and the slots or recesses 19 are provided in sufficient length so that the clamp can be further inserted toward the center of the handlebar engaging tube 16. The flexible hand engaging grip is sufficiently soft so that the enlarged end 26 as well as the enlarged end 27 can be peeled back to permit the shortening of the handlebar engaging tube 16.

Figure 6:
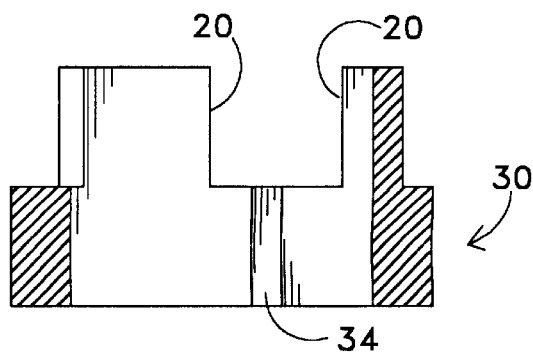
FIG. 6 is an enlarged cross-sectional view of one of the clamp members of FIG. 4 taken along line 6—6 of FIG. 4.

A cross-sectional view of the outer clamp member of FIG. 4 is shown in FIG. 6 where the tube engaging means or tabs 20 are more clearly shown.

An alternative embodiment of clamp is shown in FIG. 7 where the tabs 20' are shown positioned over the handlebar engaging tube 16 between the ribs 22 thereof. This is shown in cross-sectional view in FIG. 8. The clamp of FIG. 7 is shown as also supporting a handlebar accessory such as a hand guard, a gearshift lever or a brake handle. A brake handle 38 is shown in FIG. 7. The end clamps, being securely held to the handlebars are ideally equipped to support any accessory desired to be held at either end of the grips.

Figure 9:
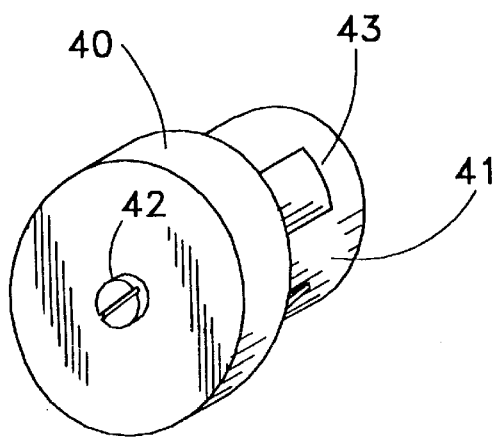
FIG. 9 is a perspective view of an alternate embodiment of end cap of the grip of FIG. 1.

A further alternative is shown in FIG. 9 where an end cap 40 has an expandable plug 41 which is tightened by tightening screw 42 on the type of handlebar grip sold under the trademark "BMX." The cap 40 has extending tabs 43 which function in an identical manner as tabs 20 or 20'. In this figure, the "clamping" or securing effect is to the inside surface of the handlebars.

The net result of the grip assembly of the present invention is a soft grip with excellent tactile feel and yet a grip which may be easily placed on the handlebars or removed therefrom. Naturally, the hard handlebar engaging tube has no tendency to stick onto the handlebars and once the clamps are removed it may be easily slid off with the hand engaging grip and a new hand engaging portion placed over the handlebar and tightened by once again tightening the outer clamp member.

Figure 10:
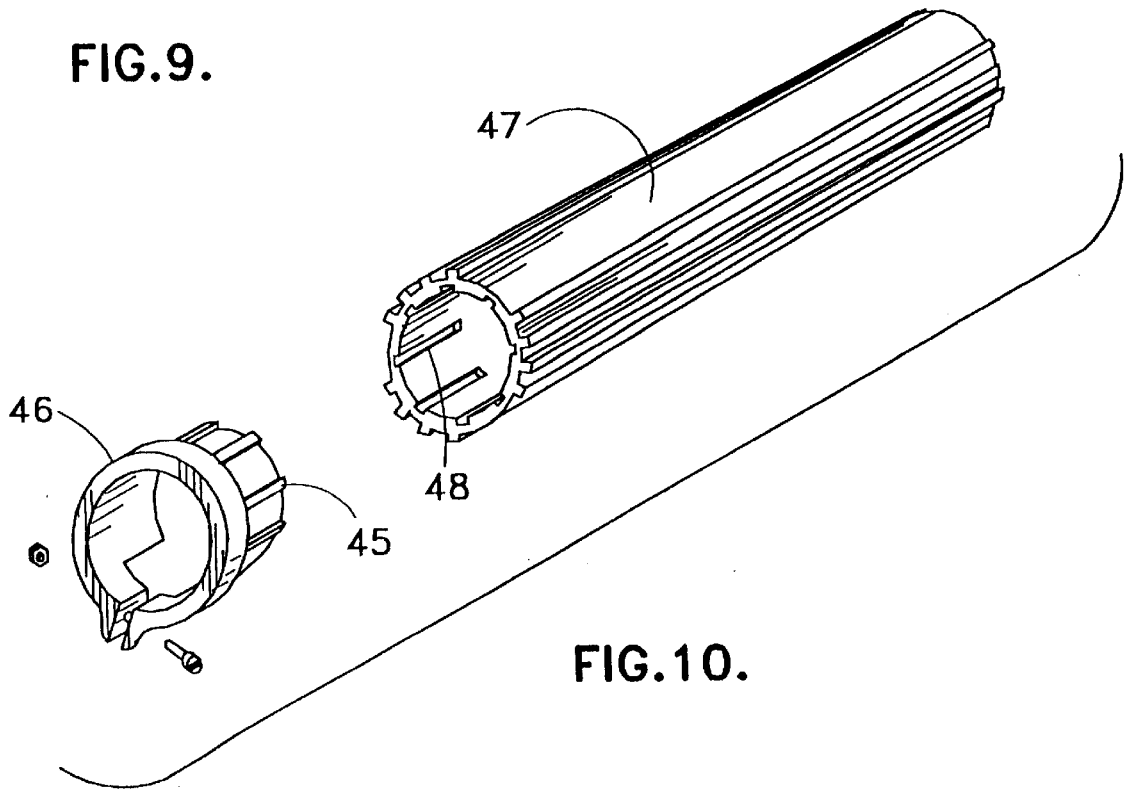
FIG. 10 is an exploded perspective view of an alternate embodiment of an end clamp and handlebar engaging tube thereof.

While inner and outer tabs have been discussed above to interlock the clamps and handlebar engaging tube, other shapes may of course be used. A spliced tube portion 45 is shown on clamp 46 in FIG. 10. Spliced tube portion 45 fits snugly into spliced tube receiving portion 48 of handlebar engaging tube 47. A hand engaging grip (not shown) may be molded over handlebar engaging tube 47.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A grip assembly attached over an end of a hollow, tubular handlebar (11) comprising:

a hollow tubular handlebar fabricated from a hollow, generally cylindrical tube having an opening (35) at a first end (14) and at a second end (15) and an outer surface;

an inner clamp member (25) tightened against the outer surface inwardly from the first end (14) of said handlebar (11), said inner clamp member (29) having an outer side facing said first end and separated therefrom, said outer side having tube engaging means (20);

a handlebar engaging tube (16) surrounding said handlebar (11) at the first end (14) thereof, said tube (16) having an inner end (18) shaped to engage the tube engaging means (20) of said inner clamp member (29) so that the handlebar engaging tube (16) will not turn with respect to said inner clamp member (29) and said handlebar engaging tube having an outer end (17) with clamp engaging means (19);

a cylindrical hand engaging grip (23) having an inner surface (25) affixed to said handlebar engaging tubs (16) so that the hand engaging grip (23) will not turn with respect thereto, said hand engaging grip (23) having an outer hand engaging surface (24); and an outer clamp member (30) affixed to said first end (14) of said handlebar (11), said outer clamp member (30) having an outer side and an inner side and having tube engaging means (20) on an inner side thereof and said hand engaging grip (23) being free to slide out of engagement with the handlebar engaging tube (16)

when the outer clamp member (30) is removed while the handlebar engaging tube (16) and inner clamp member (29) remain on the handlebar (11) and wherein hand engaging tube (16) has an enlarged end (27) which surrounds the outer surface of said inner clamp member (29).

2. The grip assembly of claim 1 wherein said tube engaging means on said inner and said outer clamp members comprises a plurality of tabs (20) extending out of said clamp members (29–30) and into matching slots (19) formed in said handlebar engaging tube (16).

3. The grip assembly of claim 2 wherein there are three tabs on said inner and said outer clamp members.

4. The grip assembly of claim 2 wherein said tabs fit into recesses formed on the inner surface of said handlebar engaging tube.

5. The grip assembly of claim 1 wherein said handlebar engaging tube has a plurality of longitudinal ribs formed on an outer surface thereof.

6. The grip assembly of claim 1 wherein said handlebar engaging tube is fabricated from a polycarbonate polymer.

7. The grip assembly of claim 1 wherein at least one of said inner clamp member and said outer clamp member supports a handlebar accessory.

8. The grip assembly of claim 7 wherein said handlebar accessory is a brake handle assembly.

* * * * *